US006720893B2

(12) United States Patent
Greenfield et al.

(10) Patent No.: US 6,720,893 B2
(45) Date of Patent: Apr. 13, 2004

(54) PROGRAMMABLE OUTPUT CONTROL OF COMPRESSED DATA FROM ENCODER

(75) Inventors: James D. Greenfield, Binghamton, NY (US); Barbara A. Hall, Endwell, NY (US); Agnes Y. Ngai, Endwell, NY (US); Edward F. Westermann, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 10/080,828

(22) Filed: Feb. 22, 2002

(65) Prior Publication Data

US 2003/0160893 A1 Aug. 28, 2003

(51) Int. Cl.[7] ................................................ H03M 7/00
(52) U.S. Cl. ...................................................... 341/50
(58) Field of Search ........................ 375/240.25, 240.26; 341/50, 51, 52

(56) References Cited

U.S. PATENT DOCUMENTS

| 5,504,484 A | 4/1996 | Wilson ........................ 341/67 |
| 6,163,836 A | 12/2000 | Dowling ....................... 712/37 |
| 6,259,740 B1 * | 7/2001 | Lyu ........................ 375/240.25 |

OTHER PUBLICATIONS

I.McIC: A Single–Chip MPEG–2 Video Encoder for Storage, A. van der Werf, et al., IEEE Journal of Solid–State Circuits, vol. 32, No. 11, Nov. 1997, pp. 1817–1823.

* cited by examiner

Primary Examiner—Brian Young
(74) Attorney, Agent, or Firm—William H. Steinberg, Esq.; Kevin P. Radigan, Esq.; Heslin Rothenberg Farley & Mesiti P.C.

(57) ABSTRACT

A technique is provided for programmably controlling output of compressed data from, for example, a video encoder. The technique can be implemented within the video encoder and includes buffering the compressed data in a write buffer, followed by transferring the compressed data from the write buffer to a read buffer. At least one programmable output mode is provided for selectively controlling output of the compressed data from the read buffer. When the read buffer is full, the compressed data is stored to the encoder's external memory to await transfer to the read buffer. The at least one programmable mode can include a slave mode, a gated master mode, a multi-cycle speed mode, and a paced master mode, which may be employed individually or in combination. A mechanism for inserting pad bytes of data into the compressed data is also provided.

21 Claims, 11 Drawing Sheets fig. 1 fig. 2 fig. 3 fig. 4

CURRENT PICTURE AFTER USING MOTION VECTORS TO ADJUST PREVIOUS PICTURE BLOCK POSITIONS

BLOCKS OF PREVIOUS PICTURE USED TO PREDICT CURRENT PICTURE fig. 5 fig. 6A fig. 6B fig. 7 fig. 8A fig. 8B fig. 8C fig. 8D fig. 8E fig. 8F

PROGRAMMABLE OUTPUT CONTROL OF COMPRESSED DATA FROM ENCODER

TECHNICAL FIELD

This invention relates in general to compression of digital images, and more particularly, to a technique for programmably controlling output of compressed data from, for example, a video encoding system.

BACKGROUND OF THE INVENTION

Technological advances in digital transmission networks, digital storage media, very large scale integration devices, and digital processing of video and audio signals have been converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The ISO MPEG-2 Compression Standard specifies only the syntax of bitstream and semantics of the decoding process. The choice of coding parameters and trade-offs in performance versus complexity are left to the encoder developer.

The compressed output of an MPEG-2 encoder is conventionally provided at an irregular rate. Typically, bursts of data are output for short durations between which there are long periods of time when no data is output. The output rate characteristics are mostly dependent on the encoding parameters and the source of video data being encoded. Conventionally, a video encode system contains large first-in first-out (FIFO) buffer devices downstream from the encoder output in order to capture the compressed stream and hold the data for transmission to a next component in the system. The size of these FIFO devices is determined by considering the worst case output rate of the encoder coupled with the worst case (i.e., slowest) read rate of the next component of the system. This estimate needs to be conservative since losing compressed output could produce an invalid MPEG stream and cause notable artifacts when the stream is decoded and displayed. The high speed, dense FIFO devices that are typically used in these systems can be quite expensive.

In view of this, there is a need in the art for enhanced approaches to handling and controlling encoder output.

SUMMARY OF THE INVENTION

The shortcomings of the prior art are overcome and additional advantages are provided through the provision of a method of controlling output of compressed data from an encoder. The method includes: buffering the compressed data in a write buffer; transferring the compressed data from the write buffer to a read buffer; and providing a plurality of programmable output modes for selectively controlling output of the compressed data held in the read buffer of the encoder.

In an enhanced aspect, the transferring includes moving compressed data from the write buffer to the read buffer until the read buffer is full, then writing blocks of compressed data from the write buffer to an external memory of the encoder. Thereafter, a block of data is written from the external memory to the read buffer whenever the read buffer has sufficient space to accept the block of compressed data. An outstanding block count is used by a controller of the write buffer and the read buffer to determine when to write data to and read data from the external memory.

As a further enhancement, the plurality of programmable output modes can include at least one of a slave mode, a gated master mode, a multiple cycle speed mode, and a paced master mode. Additionally, the method may include detecting an indicator in the compressed data and responsive thereto padding bytes of data prior to output of the compressed data. In one implementation, the indicator could comprise an illegal or invalid start code. The padding of bytes of data proceeds until the pad count associated with the illegal start code is exhausted.

Systems and computer program products corresponding to the above-summarized methods are also described and claimed herein.

Advantageously, techniques are provided for controlling output of compressed data from an encoder. Control is facilitated by providing a plurality of programmable output modes for selectively controlling the timing and presentation of the compressed data output of the encoder. Buffers are provided within the encoder to allow for this programmable output mode control. By buffering compressed data within the encoder and, for example, producing a compressed data output at a regular rate, the need for dense external FIFOs is either minimized or eliminated depending upon the application. Further, the buffers and programmable output modes presented could be configured to hold compressed data until a user specifically requests the data from the encoder. In another mode, output timing could be extended to multiple encoder cycles, thus allowing the attachment of slower, less expensive FIFOs, or other inexpensive memory.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The invention relates, for example, to MPEG compliant encoders and encoding processes such as described in "Information Technology-Generic coding of moving pictures and associated audio information: Video," Recommendation ITU-T H.262, ISO/IEC 13818-2, International Standard, 1996. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in an "I" frame picture. Spatial redundancy is the redundancy within a picture. The MPEG-2 Standard uses a block based method of reducing spatial redundancy. The method of choice is the discrete cosine transformation, and discrete cosine transform coding of the picture. Discrete cosine transform coding is combined with weighted scalar quantization and run length coding to achieve a desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

One method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
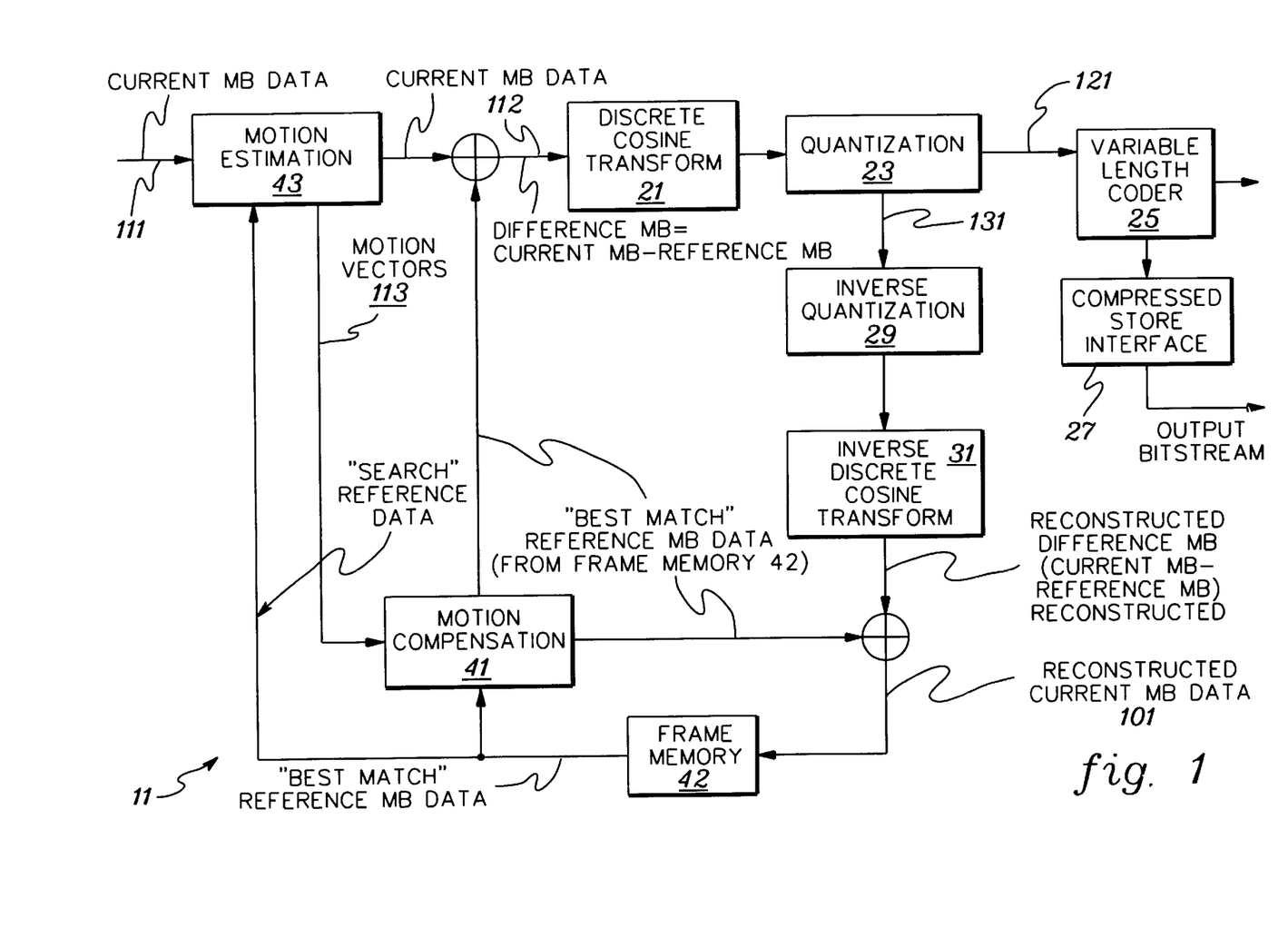
FIG. 1 shows a flow diagram of a generalized MPEG-2 compliant encoder 11, including a discrete cosine transformer 21, a quantizer 23, a variable length coder 25, a compressed store interface 27, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

For purposes of illustration, a generalized flowchart of MPEG compliant encoding is shown in FIG. 1. In the flowchart, the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; and then to another element 27, i.e., a compressed store interface, for processing before transmission. The other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
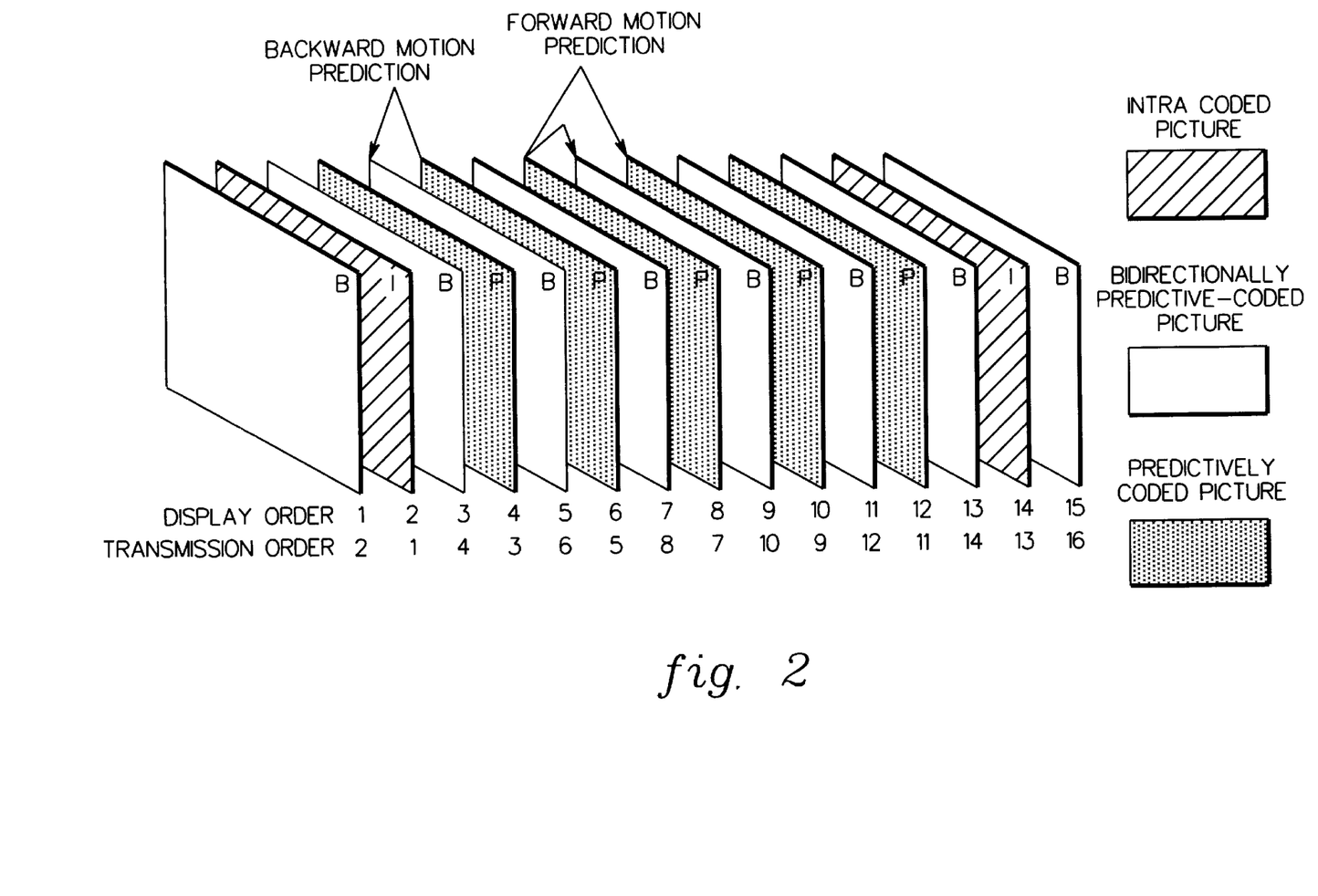
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
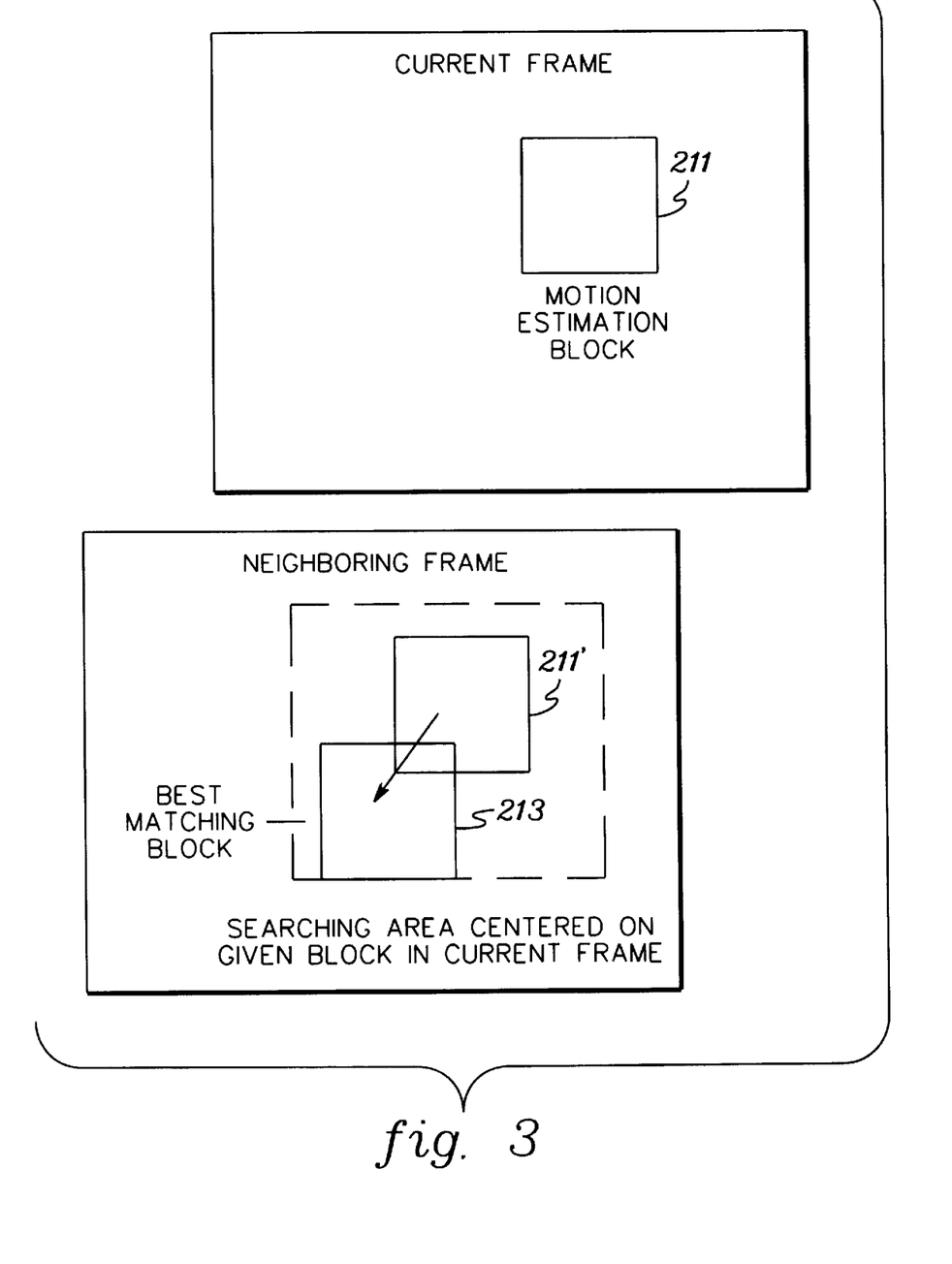
FIG. 3 illustrates the search from the motion estimation block in the current frame or picture to the best matching block in a subsequent or previous frame or picture. Elements 211 and 211' represent the same location in both pictures.
Figure 4:
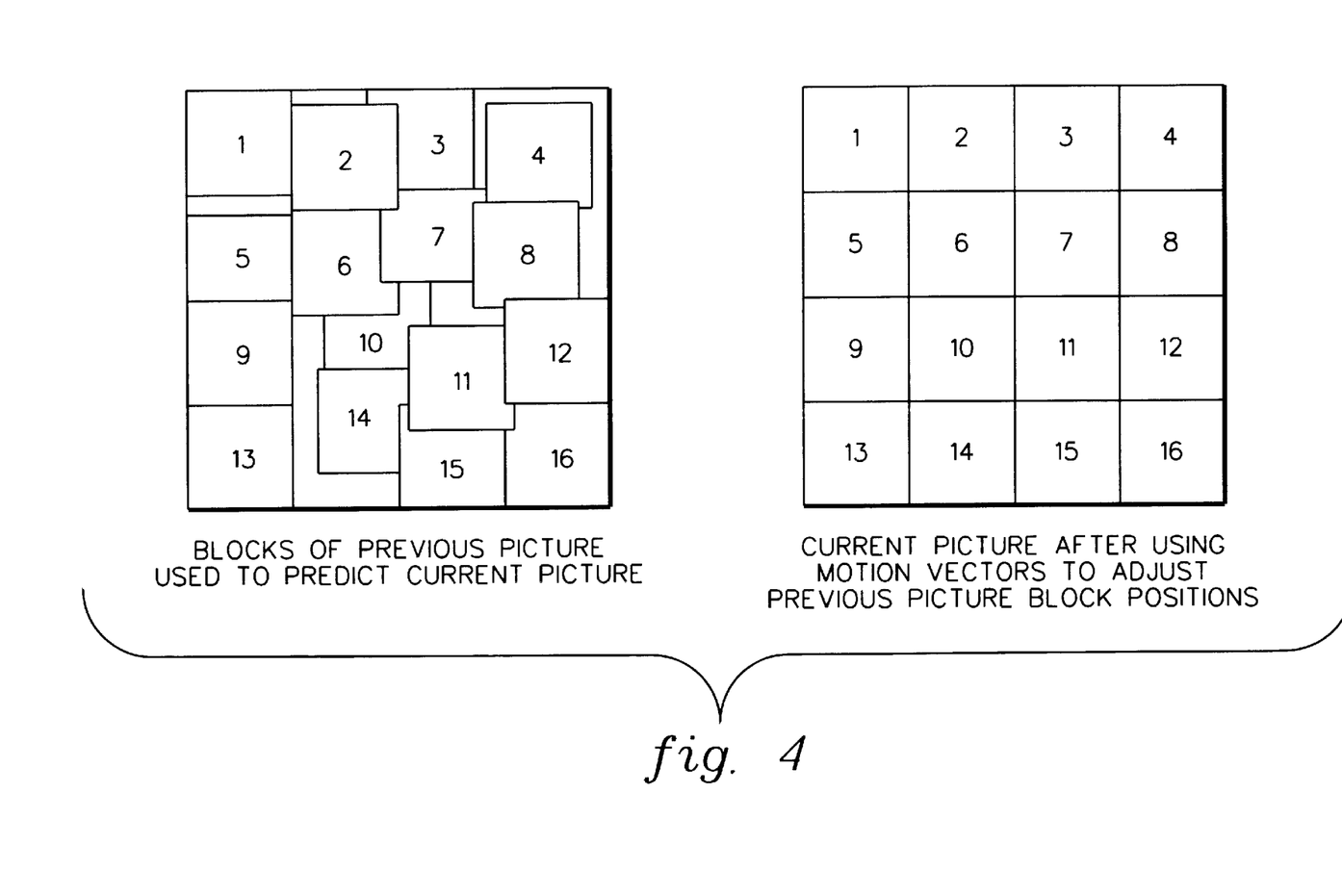
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, processing searches for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in further detail in U.S. Pat. No. 6,118,823 by Carr et al., entitled "Control Scheme For Shared-Use Dual-Port Predicted Error Array," which is hereby incorporated herein by reference in its entirety.

A typical MPEG encoder will output data as the data becomes available. This is conventionally desired to achieve high bit rate, real-time encoding without slowing down the encoder pipeline. As noted, the compressed output of an MPEG encoder is provided at an irregular rate; that is, the output may include data bursts for short durations, followed by long periods of time when no data is provided.

An encoder system often includes a mechanism for capturing the compressed stream output from the encoder for forwarding to a next component in the system. Generally, FIFO devices are used to accomplish this. The high speed, dense FIFOs that are commonly used can be quite expensive. Thus, in order to minimize or even eliminate the need for an external FIFO, presented herein are various buffering and control processes for implementation, in one example, within the encoder itself. Using these processes, data can be produced for output at a regular rate, or the encoder can be configured to hold data until a user requests the data, or output timings could be extended to multiple encoder cycles to allow for the attachment of slower, less expensive FIFOs or other memory.

Figure 5:
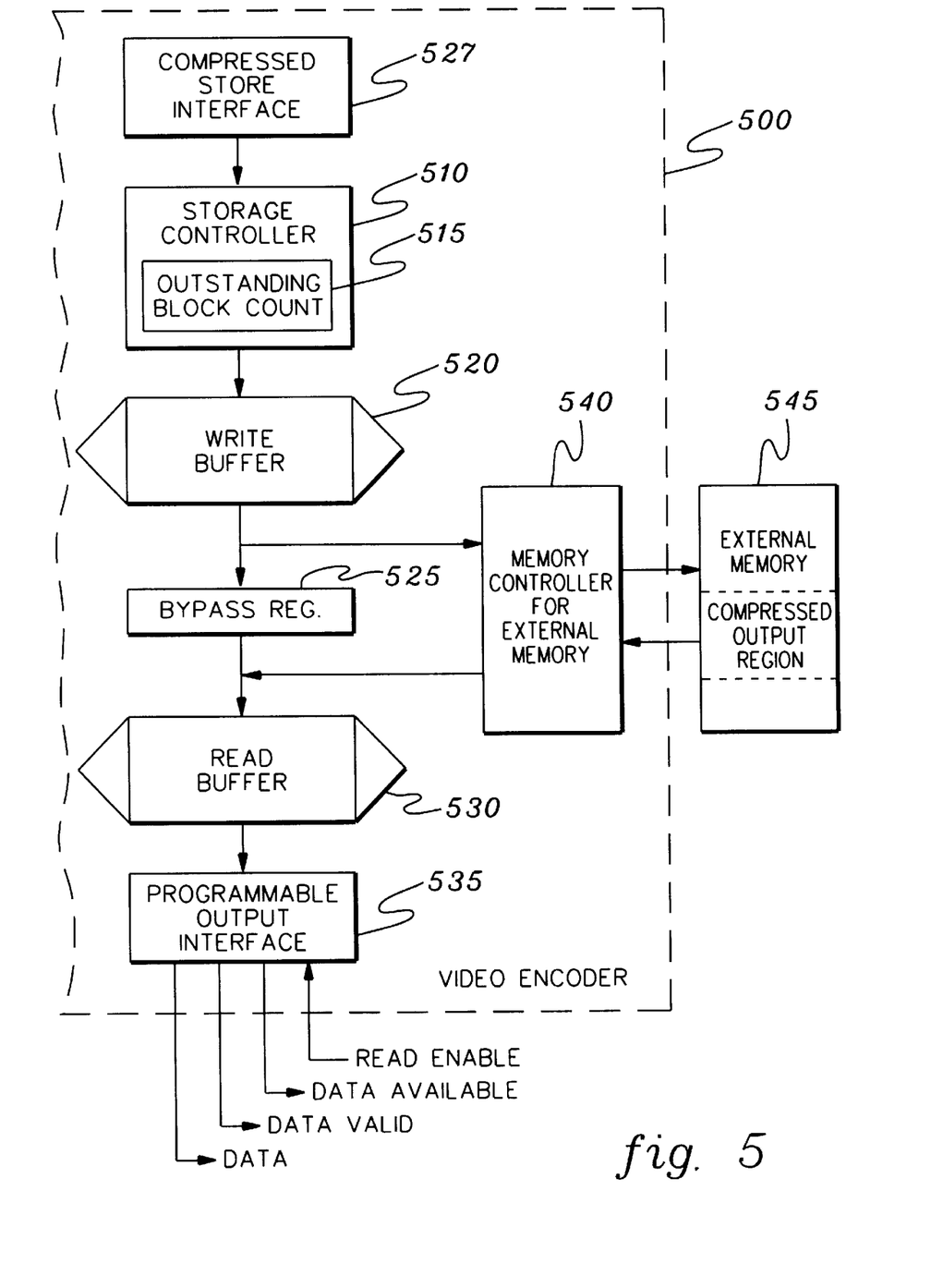
FIG. 5 illustrates one embodiment of a video encoder with a storage controller 510, a write buffer 520, a read buffer 530 and a programmable output interface 535, in accordance with aspects of the present invention.

FIG. 5 depicts one embodiment of a video encoder 500 implementing logic in accordance with an aspect of the present invention. A compressed store interface 527 outputs the compressed data in a manner similar to compressed store interface 27 of FIG. 1. As compressed data is output by compressed store interface 527, the data is written by a storage controller 510 into a write buffer 520. In one example, the write buffer may be a 128 byte write buffer. When the write buffer accumulates valid data, storage controller 510 transfers the data to a read buffer 530 via a bypass register 525. In one example, the read buffer may be a 1,280 byte buffer (and can be programmed for fetch sizes of, for example, 32, 64, 128 or 256 bytes).

Assuming that the output of the read buffer is controlled using one or more of the programmable output modes described below, then data may be withdrawn from the read buffer at a rate slower than data is being placed into the buffer. When the read buffer becomes full, storage controller 510 transfers a next block of data (e.g., 32 bytes of data) from write buffer 520 to an external memory controller 540 which in turn writes the data to a portion of the encoder's external memory 545. This external memory 545 is also used by other functions within the encoder. The storage controller 510 tracks how much data is stored to external memory via an outstanding block count register 515. The amount of external memory available for compressed output is programmable, with one default value being 512 KB. As long as the outstanding block count 515 is greater than zero, then whenever there is space available in read buffer 530 for the fetch size selected, the storage controller 510 will fetch data from external memory via the memory controller 540. As data is fetched from external memory, the storage controller decrements the outstanding block count register 515.

The bypass path between write buffer 520 and read buffer 530, which includes the bypass register 525, is provided in order to minimize storage accesses. Whenever the outstanding block count register 515 is zero, the compressed stream is transferred from the write buffer to the read buffer, and will not be written to external memory provided there is space in the read buffer.

A programmable output interface 535 reads the compressed data from read buffer 530 for output from the encoder. Output interface 535 outputs data to a data bus, for example, a two byte data bus, and provides a data valid output and a data available output. Interface 535 also has a read enable input, which is a user input to the interface. In one embodiment, the control lines may default to minus active, but could be individually configured to be positive active.

As explained further below, interface 535 can operate in one of a plurality of modes. For example, the interface could operate in either a master mode or a slave mode. In master mode, data is outputted as the data becomes available, while in slave mode, a user monitors the data available signal and when available, requests the data using the read enable input.

Since the compressed data is held in read buffer 530, and also external memory 545, the data can be output at a more constant rate. For example, the interface can be configured to run in a paced master mode where a programmable number of wait states are inserted between each compressed data output. In this mode, the burstiness of the encoder is restrained internally, thereby minimizing the size of the external FIFO.

The interface can also be configured in a gated master mode. In this mode, the encoder only outputs compressed data when the read enable input is active. The user can thus stop or hold the output at any time by deactivating read enable. The compressed stream will be buffered internally until read enable is again activated. The paced and gated master modes can also be enabled concurrently.

Another factor that contributes to the high price of external FIFO's is the speed grade. If compressed data is output every encoder cycle, then high speed FIFO's are required to capture the output. The programmable output interface presented herein can thus be configured to run in, for example, half-speed mode where the data bus and data valid are active for two encoder cycles. This allows lower bitrate applications to use slower, less expensive FIFOs at the encoder output.

For applications that require total control of the encoder output the interface can be configured in a slave mode. In this mode, the user monitors the data available signal and then asserts read enable for each piece of compressed data. The data available signal can also be programmed to tell the user how much data the encoder has accumulated, for example, in sixteen byte increments up to 1024 bytes. This is useful for applications that wish to hold a data transfer until a specified amount of data is available.

One method which can be used to avoid storing pad bytes to memory relies on the use of an invalid MPEG start code. MPEG start codes are today a byte aligned 32 bit value of the form hex "000001XX" where "XX" represents the type of start code. A decode of "XX" that is not defined in the MPEG standard would be an invalid start code and should not be contained in the compressed stream. In this invention, the encoder inserts an invalid start code in the stream for decoding by the programmable output interface. The invalid start code can comprise an imbedded padding count marker followed by a padding count. The code and count are then written to memory instead of the actual pad data. When the compressed stream is later read from memory, the programmable output interface detects the imbedded marker and count, discards them from the compressed stream and pads the data by the amount specified. This eliminates memory accesses when the data is known to be all zeroes.

Figure 6A:
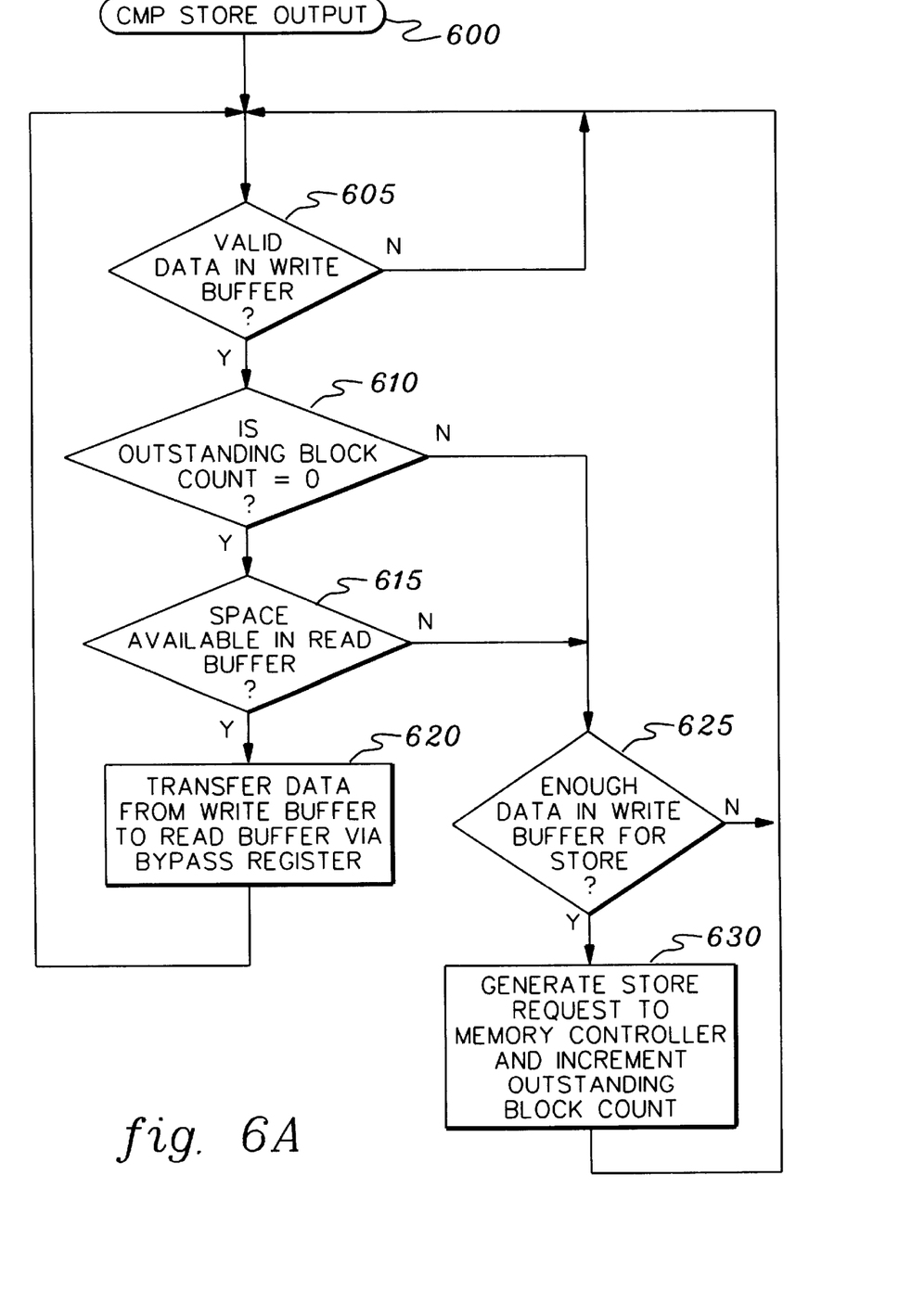
FIG. 6A illustrates one embodiment of a control process for selectively writing blocks of data from write buffer 520 to read buffer 530 or to external memory 545, in accordance with an aspect of the present invention.
Figure 6B:
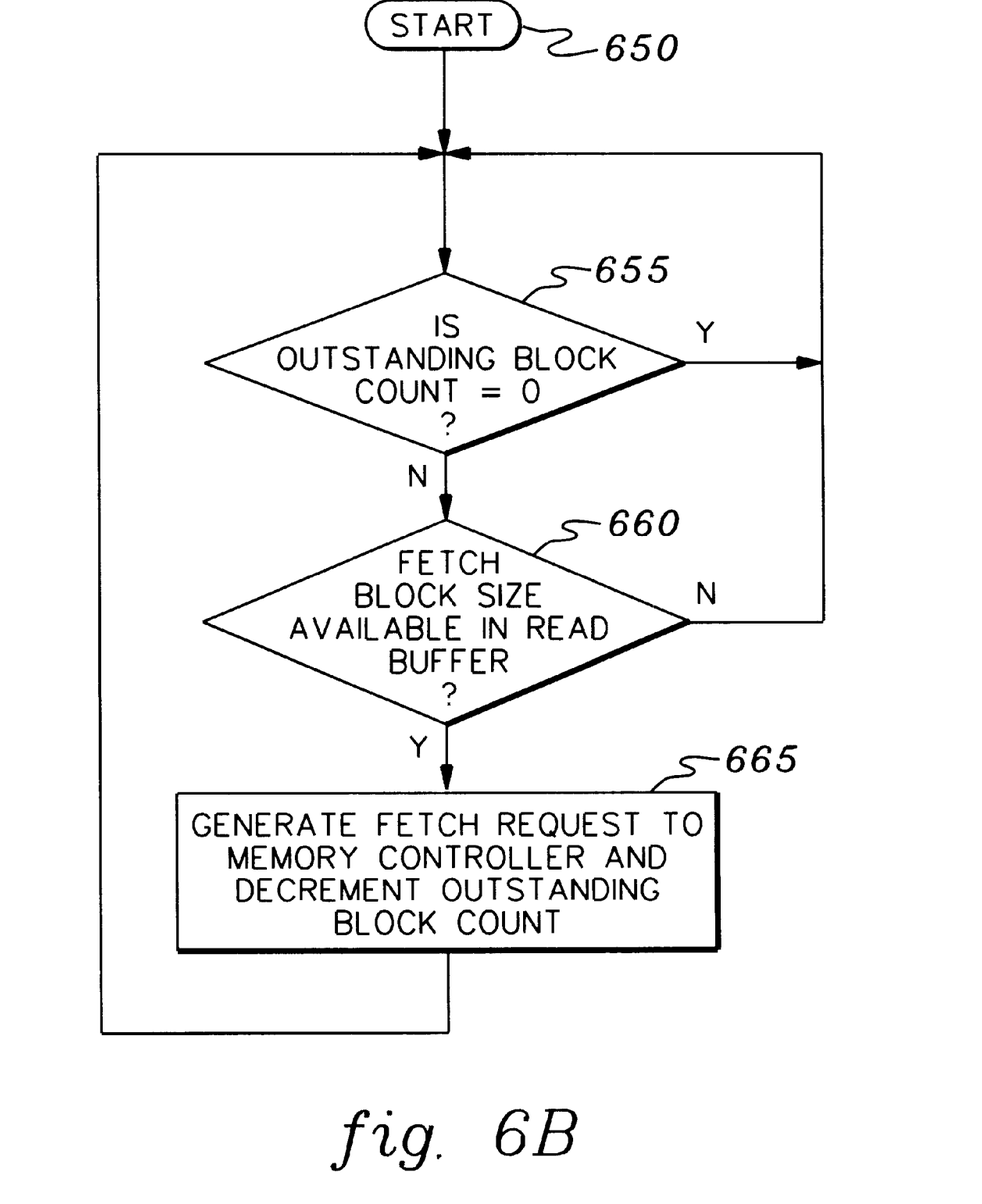
FIG. 6B illustrates one embodiment of a control process for fetching a block of compressed data from external memory 545 for writing to the read buffer, in accordance with an aspect of the present invention.
Figure 7:
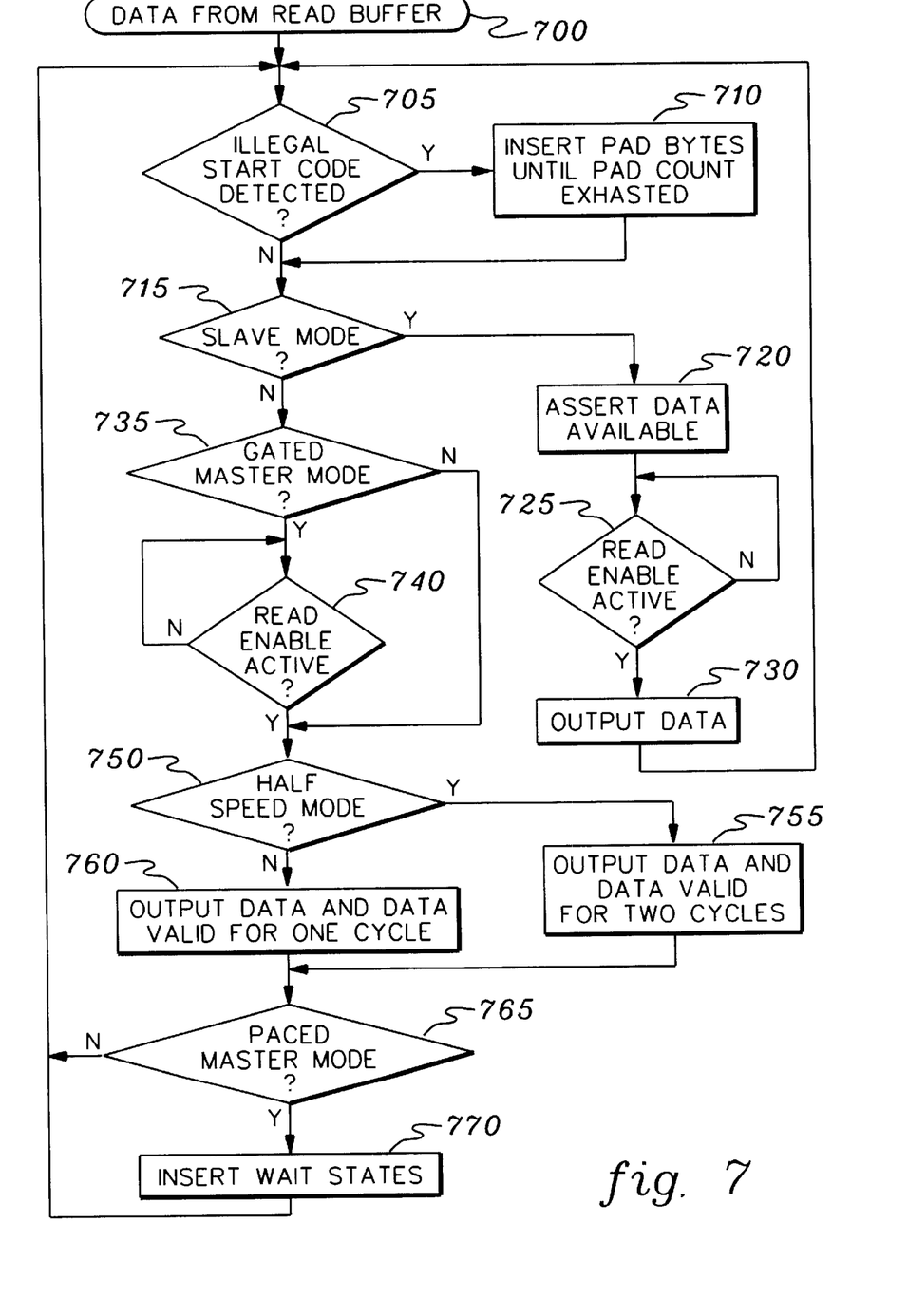
FIG. 7 illustrates one embodiment of programmable output interface processing, in accordance with an aspect of the present invention.

By way of further explanation, FIGS. 6A & 6B depict one embodiment of control processing for storage controller 510 of FIG. 5, while FIG. 7 depicts one embodiment of control processing implemented by programmable output interface 535. FIGS. 8A–8F depict various timing diagrams showing exemplary output from the interface in various programmable modes, in accordance with aspects of the present invention.

As shown in FIG. 6A, compressed data is received from the compressed store interface 600 into write buffer 520 from which the storage controller transfers the data either to the read buffer directly (using the bypass register) or to the read buffer via the external memory. In this example, the storage controller initially determines whether there is valid data in the write buffer 605. If "no", then processing awaits receipt of valid data into the write buffer. Valid data refers to the existence of data within the write buffer that is yet to be written out either to external memory or to the read buffer. Once valid data exists within the write buffer, then processing determines whether the outstanding block count is zero 610. If so, the controller confirms that space is available in the read buffer to accept the compressed data 615. Assuming that space is available, then the data is transferred directly from the write buffer to the read buffer via the bypass register 620.

If either the outstanding block count is greater than zero or space is unavailable in the read buffer, then the controller inquires whether there is enough data in the write buffer for a store operation to external memory 625. In one embodiment, data can be stored to external memory in blocks of 32 bytes. Assuming that a block of data does exist, then the storage controller generates a store request to the memory controller for writing the block of data into external memory. The outstanding block count is incremented by one with the writing of each block of data into memory. In the next pass through, the controller determines that the outstanding block count is other than zero, and continues to generate store requests to the memory controller whenever a block of data is available for writing. The bypass path from the write buffer to the read buffer is therefore only employed when, for example, initially starting the encoder, or whenever the outstanding block drops to zero.

FIG. 6B depicts one embodiment of processing for fetching a block of data from external memory once the outstanding block count is greater than zero. Upon starting 650, processing determines whether the outstanding block count is zero 655. If so, then no action is taken since no data is stored in memory. Once the outstanding block count is other than zero, the controller determines whether the fetch block size is available in the read buffer 660 (i.e., is space available in the read buffer for a block of compressed data). If "no", then processing returns to the top of the loop and waits for sufficient space in the read buffer before the block of compressed data can be transferred. Once "yes", a fetch request is generated by the storage controller and sent to the memory controller for transfer of a block of data from the compressed output region of external memory to the read buffer. Along with this transfer, the outstanding block count is decremented by one.

As noted, output of data from the read buffer is handled by the programmable output interface. FIG. 7 depicts one embodiment of processing which can be implemented at the output interface in accordance with the present invention.

In this embodiment, data is retrieved from the read buffer 700 and the interface determines whether there is an illegal start code within the compressed data 705. The illegal start code is employed in accordance with one aspect of the present invention as a flag to indicate a number of bytes of zero data to be inserted into the data stream. The padding of bytes of data continues until a pad count associated with the illegal start code is exhausted 710. The balance of FIG. 7 provides examples of the various programmable output modes which could be employed by the output interface.

Figure 8A:
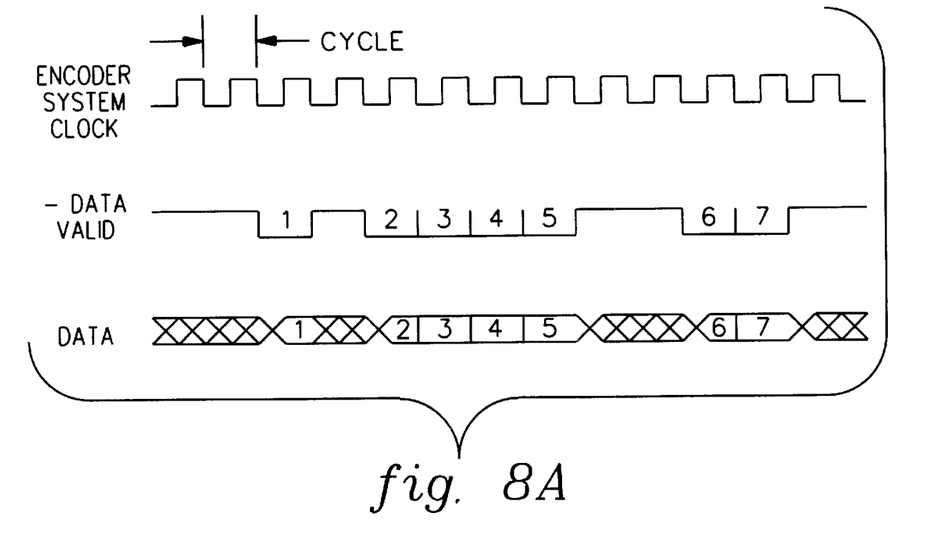
FIG. 8A is an exemplary timing diagram of a conventional output of the encoder's compressed store interface logic.

Before discussing these modes, reference is made to FIG. 8A which is an exemplary timing diagram showing a typical compressed store interface output. In this example, the encoder system clock signal is shown, along with a data valid signal and a data output. The data valid signal is minus active, so that whenever the encoder has data to output, it drops the data valid signal as shown. This is followed by output of the compressed data onto the data bus. The output of the data onto the bus is sporadic with, for example, data pieces 2–5 being followed by several cycles in which the data bus is inactive. In accordance with the present invention, programmable output modes are provided to a user to allow control of the encoder output for presentation of data at a desired time or rate.

Figure 8B:
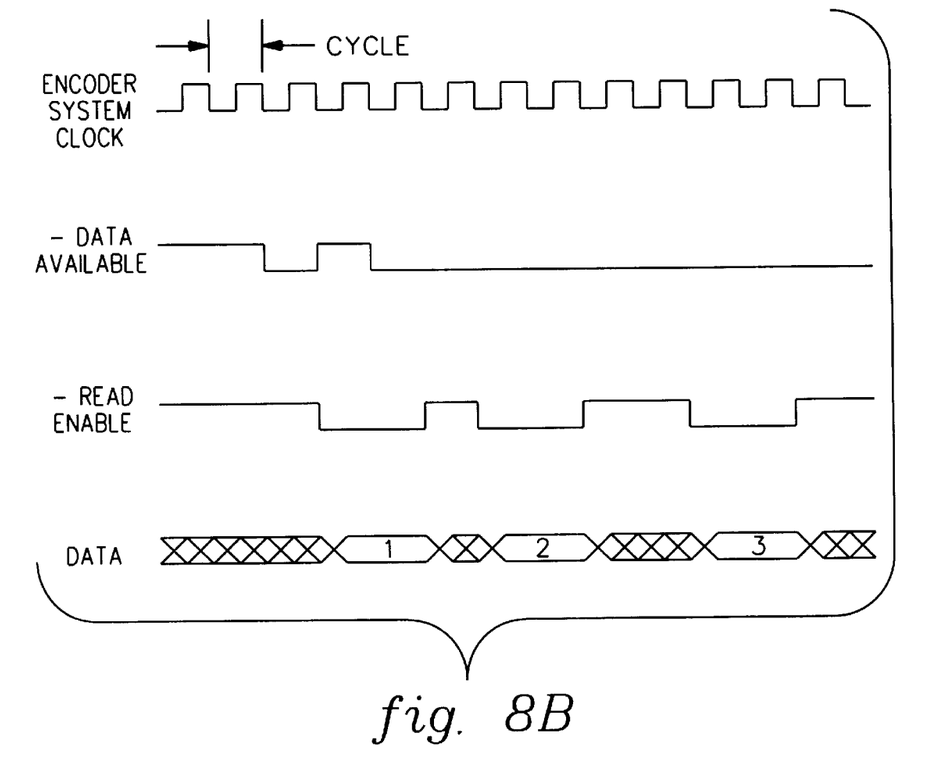
FIG. 8B is an exemplary timing diagram of output from a programmable output interface when employing a programmable slave mode, in accordance with an aspect of the present invention.

Continuing with FIG. 7, the output interface first determines whether a slave mode is programmed 715. If "yes", then processing asserts the data available signal 720 and inquires whether the user's read enable signal is active 725. Once "yes", the compressed data is output 730 and processing returns to obtain a next piece of compressed data. FIG. 8B depicts one example of typical slave mode timings using the compressed data output depicted in FIG. 8A. As shown, placement of data onto the data bus is controlled by the data available signal being active, as well as the read enable signal being asserted. Once data is available, the user read enable signal controls the rate at which data is output. The data available signal remains active after receipt of the second piece of compressed data since the user is reading the data out (via the read enable signal) at a slower rate than the data becomes available. Because the user is reading the data more slowly than available, the data will be buffered into the read buffer, and once full, stored into the external memory as explained above.

Figure 8C:
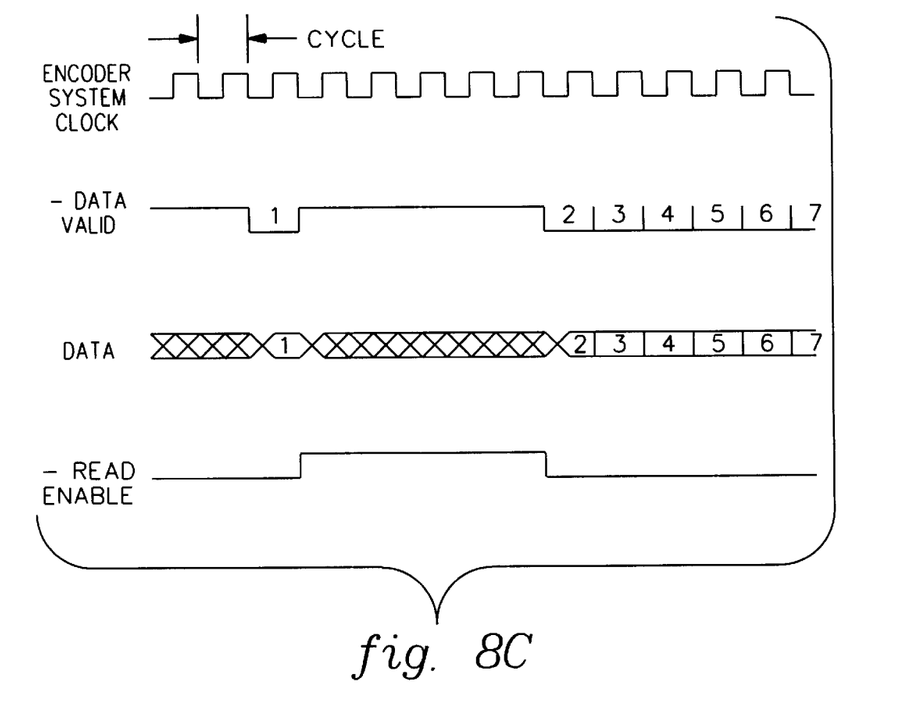
FIG. 8C is an exemplary timing diagram of output from a programmable output interface when employing a gated master mode, in accordance with an aspect of the present invention.

Assuming that the slave mode is inactive, then the interface determines whether a gated master mode has been programmed 735. If so, data is output only if the read enable signal is active 740. An example of the gated master mode is depicted in FIG. 8C. In this example, the data valid and data output onto the bus are suppressed whenever the read enable signal is inactive. Thus, even though data is available at an earlier time (see FIG. 8A), the data is suppressed and buffered until the read enable goes minus active. At this point, any suppressed data that is available can be immediately output in successive encoder cycles.

Figure 8D:
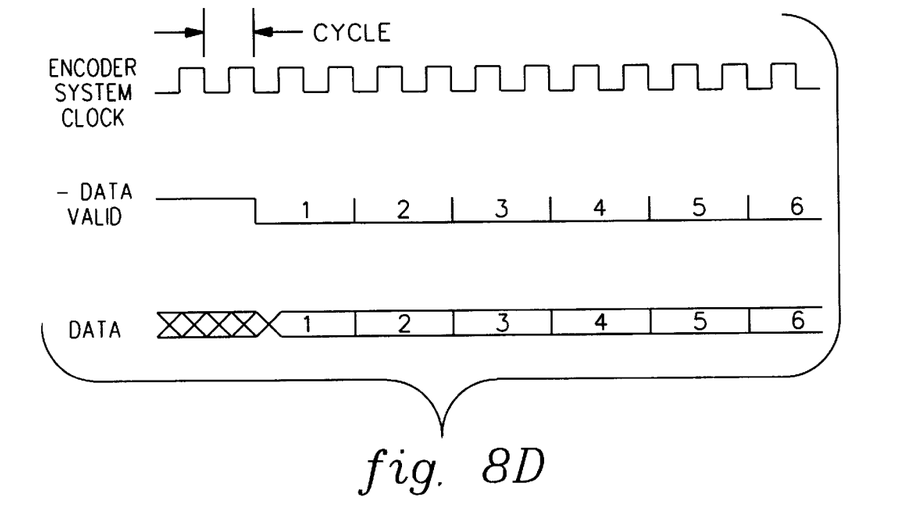
FIG. 8D is an exemplary timing diagram of output from a programmable output interface when employing a half speed mode, in accordance with an aspect of the present invention.

Processing next determines whether the interface has been programmed to output data in a half-speed mode 750. If "yes", then each data output as well as the corresponding data valid signal is provided for two encoder cycles 755. Otherwise, the interface outputs the data and the data valid signal every cycle in a conventional manner 760. FIG. 8D depicts an exemplary timing diagram for a half-speed mode. As shown, both the data valid signal and the data are asserted for two cycles instead of one when the half-speed mode is programmed. By using this mode, a slower interface could be coupled to the encoder, thereby allowing less expensive downstream buffering to be employed. In essence, the encoder output would be slowed down to double cycle. Those skilled in the art will also recognize that other multi-cycle speed modes could be employed rather than the two cycle mode depicted.

Figure 8E:
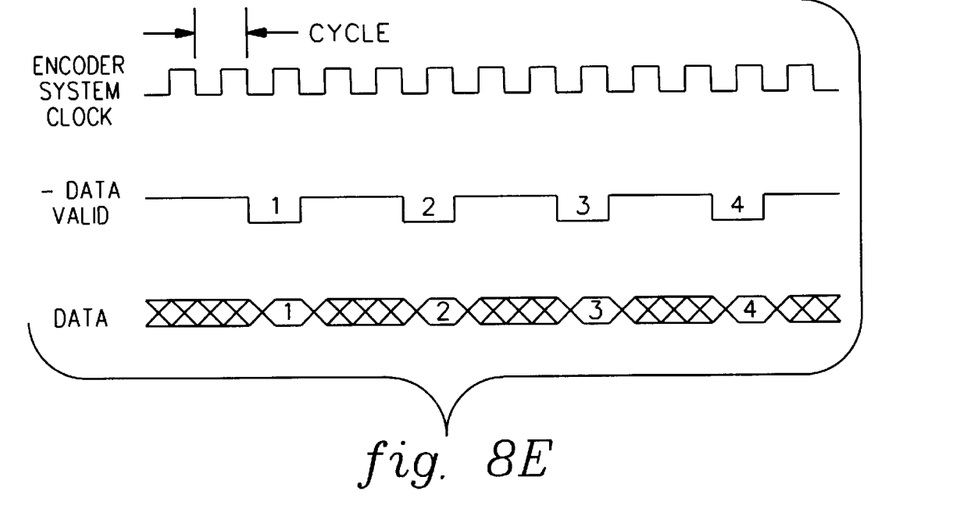
FIG. 8E is an exemplary timing diagram of output from a programmable output interface when employing a paced master mode with two wait states, in accordance with an aspect of the present invention.

The interface processing of FIG. 7 thereafter determines whether a paced master mode has been programmed 765. If "no", then the data is output unmodified or modified in accordance with one or more program modes discussed above. If the paced master mode is programmed, then one or more wait states are inserted between outputted data pieces 770. A wait state may comprise one encoder cycle, and the number of cycles between output of the data can be user programmed if desired. FIG. 8E depicts an example of a paced master mode having two wait states interposed between output of data. Thus, in this example the data valid and data output are paced notwithstanding that the data becomes available at an earlier time (compare FIG. 8A).

Figure 8F:
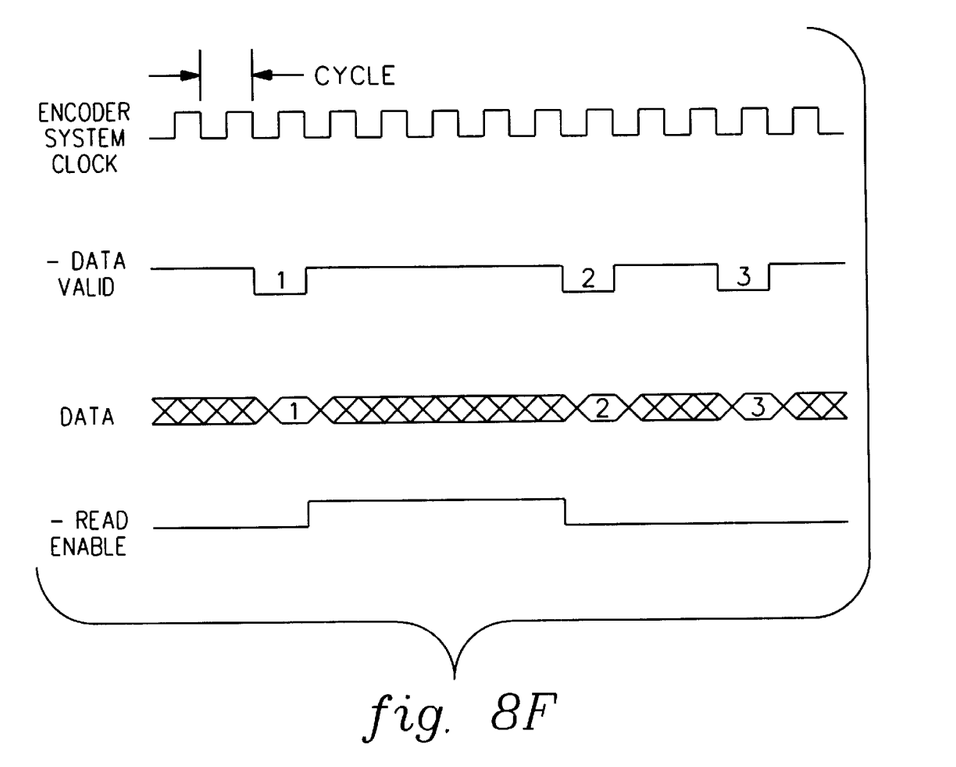
FIG. 8F is an exemplary timing diagram of output from a programmable output interface when employing a paced gated master mode with two wait states, in accordance with an aspect of the present invention.

Those skilled in the art will recognize that the programmable output modes discussed herein could be used in combination if desired. For example, FIG. 8F depicts an example of a timing diagram for a paced gated master mode having two wait states between data output. In this example, the paced master mode provides the data valid and data output with two wait states between outputting of data. Because the mode is also gated, the read enable signal controls whether the paced output proceeds. Thus, when the read enable is inactive, the data valid signal is inactive and no data is output. Other mode combinations are also possible using the interface processing of FIG. 7.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling output of compressed data from an encoder, comprising:
   buffering the compressed data in a write buffer of the encoder;
   transferring the compressed data from the write buffer to a read buffer of the encoder; and
   providing a plurality of programmable output modes for selectively controlling output of the compressed data from the read buffer of the encoder.

2. The method of claim 1, wherein the transferring comprises moving compressed data from the write buffer to the read buffer until the road buffer is full, then writing blocks of compressed data from the write buffer to an external memory of the encoder, and wherein the transferring further comprises writing a block of compressed data from the external memory into the read buffer when the read buffer has sufficient space to accept the block compressed data from the external memory.

3. The method of claim 2, wherein the writing of the block of data to external memory from the write buffer comprises forwarding a store request to a memory controller of the external memory, and incrementing an outstanding block count by one, and wherein the writing of the block of data from the external memory into the read buffer comprises determining that a fetch block size is available within the read buffer and if so, forwarding a fetch request to the memory controller of the external memory, and decrementing the outstanding block count by one.

4. The method of claim 1, wherein the plurality of programmable output modes includes a slave mode, and wherein the method further comprises determining whether the slave mode has been programmed, and if so, asserting a data available signal on an output of the encoder when compressed data is available in the read buffer for output, and responsive to a user read enable signal being active, outputting compressed data from the read buffer.

5. The method of claim 1, wherein the providing includes providing a gated master mode as one mode of the plurality of programmable output modes, wherein the grated master mode determines whether a user read enable signal is active, and if so, outputs compressed data from the read buffer when available.

6. The method of claim 1, wherein the providing includes providing a multiple cycle speed mode as one mode of the plurality of programmable output modes, wherein the multiple cycle speed mode determines whether compressed data to be output from the encoder is asserted for a single cycle or for multiple cycles.

7. The method of claim 1, wherein the providing includes providing a paced master mode as one mode of the plurality of programmable output modes, wherein the paced master mode determines whether one or more wait states are to be inserted between output of compressed data from the encoder.

8. The method of claim 1, wherein the plurality of programmable output modes includes at least some of a slave mode, a gated master mode, a multi-cycle speed mode, and a paced master mode.

9. The method of claim 8, wherein the method further comprises selectively employing in combination at least some programmable output modes of said plurality of programmable output modes.

10. The method of claim 1, further comprising detecting whether an indicator has been inserted into the compressed data, and if so, inserting pad bytes of data until a pad count corresponding to a number associated with the indicator has been exhausted, the inserting of pad bytes being prior to output of the compressed data from the encoder.

11. An encoder system having control of compressed data output, said system comprising:
    a write buffer of an encoder for buffering the compressed data;
    a read buffer of the encoder;
    means for transferring the compressed data in the write buffer to the read buffer of the encoder; and
    a programmable output interface containing at least one programmable output mode for selectively controlling output of the compressed data from the read buffer of the encoder.

12. The system of claim 11, wherein the means for transferring comprises means for moving compressed data from the write buffer to the read buffer until the read buffer is full, then for writing blocks of compressed data from the write buffer to an external memory of the encoder, and wherein the means for transferring further comprising means for writing a block of compressed data from the external memory into the read buffer when the read buffet has sufficient space to accept the block of compressed data from the external memory.

13. The system of claim 12, wherein the means for writing the block of data to external memory from the write buffer comprises means for forwarding a store request to a memory controller of the external memory, and the incrementing an outstanding block count by one, and wherein the means for writing the block of data from the external memory into the read buffer comprises means for determining that a fetch block size is available within the read buffer and when so, means for forwarding a fetch request to the memory controller of the external memory, and for decrementing the outstanding block count by one.

14. The system of claim 11, wherein the at least one programmable output mode includes a slave mode, and wherein the slave mode comprises means for asserting a data available signal on an output to the encoder when compressed data is available in the read buffer for output, and responsive to a user read enable signal being active, for outputting compressed data from the read buffer.

15. The system of claim 11, wherein the at least one programmable output mode includes a gated master mode, wherein the gated master mode comprises means for determining whether a user read enable signal is active, and if so, for outputting compressed data from the read buffer when available.

16. The system of claim 11, wherein the at least one programmable output mode comprises a multiple cycle speed mode, and wherein the multiple cycle speed mode comprises means for asserting compressed data output from the encoder for a single cycle or for multiple cycles.

17. The system of claim 11, wherein the at least one programmable output mode comprises a paced master mode, wherein the paced master mode comprises means for inserting one or more wait states between compressed data output from the encoder.

18. The system of claim 11, wherein the at least one programmable output mode comprises at least one of a slave made, a gated master mode, a multi-cycle speed mode, and a paced master mode.

19. The system of claim 18, wherein the at least one programmable output mode comprises a plurality of the programmable output modes, and wherein the system further comprises means for selectively employing in combination at least some programmable output modes of said plurality of programmable output modes.

20. The system of claim 11, further comprising means for detecting whether an indicator has been inserted into the compressed data, and if so, means for inserting pad bytes of data until a pad count corresponding to a number associated with the indicator has been exhausted, the inserting of pad bytes being prior to output of the compressed data from the encoder.

21. At least one program storage device readable by a machine, tangibly embodying at least one program of instructions executable by the machine to perform a method of controlling output of compressed data from an encoder, the method comprising:
  buffering the compressed data in a write buffer;
  transferring the compressed data from the write buffer to a read buffer; and
  providing a plurality of programmable output modes for selectively controlling output of the compressed data from the read buffer.

* * * * *